United States Patent [19]

Gerard et al.

[11] Patent Number: 4,704,711

[45] Date of Patent: Nov. 3, 1987

[54] PROCESS AND DEVICE FOR REGENERATING THE PHASE OF SYNCHRONIZING SIGNALS IN A DATA CARRIER OPTICAL WRITE-READ APPARATUS

[75] Inventors: Jean-Louis Gerard; Marc Loret, both of Paris, France

[73] Assignee: Thomson-CSF, Paris, France

[21] Appl. No.: 766,797

[22] Filed: Aug. 19, 1985

Related U.S. Application Data

[63] Continuation of Ser. No. 473,809, Mar. 9, 1983, Pat. No. 4,566,091.

[30] Foreign Application Priority Data

Mar. 12, 1982 [FR] France ............................. 82 04220

[51] Int. Cl.$^4$ ............................................. G11B 7/00
[52] U.S. Cl. ..................................... 369/59; 358/342; 360/39; 360/41; 360/51
[58] Field of Search ................... 358/342; 369/32, 33, 369/43–46, 59, 124; 360/39, 40, 41, 51

[56] References Cited

U.S. PATENT DOCUMENTS 4,297,737 10/1981 Andresen et al. ............... 360/77 X 4,443,870 4/1984 Hazel et al. ............................ 369/44

*Primary Examiner*—Robert L. Richardson
*Attorney, Agent, or Firm*—Oblon, Fisher, Spivak, McClelland & Maier

[57] ABSTRACT

Process for the regeneration of synchronizing signals used for writing and/or reading recorded digital data or for recording on an optical data carrier, wherein the synchronizing signals are regenerated in phase by determining the phase shift of the center of specific pulses with respect to a clock signal. According to a preferred variant, the specific data and the useful information data are coded by a N.R.Z.-type code, the specific data being associated with pulse durations not used in the N.R.Z. code for recording information data. The specific data can be recorded in time multiplexing with digital information data or, according to a preferred variant, in the form of flags at regularly spaced locations on the tracks which define between them zones intended for the recording of data blocks. The recording of these flags can take place prior to any recording of digital information data in preetched form. The synchronizing signals regenerated on the basis of the reading of these flags can then also be used for writing during the information data recording phases.

14 Claims, 9 Drawing Figures

PROCESS AND DEVICE FOR REGENERATING THE PHASE OF SYNCHRONIZING SIGNALS IN A DATA CARRIER OPTICAL WRITE-READ APPARATUS

This is a continuation of application Ser. No. 473,809, filed Mar. 9, 1983 and now U.S. Pat. No. 4,566,091.

BACKGROUND OF THE INVENTION

The present invention relates to a process for regenerating the phase of synchronizing signals used in an apparatus for the optical transcription of data on a data carrier, during the write and/or read phases, particularly of digital data recorded on a disk. It also relates to an optical device for performing this process.

Recording methods are well known to the skilled Expert and fall outside the scope of the present invention. Information is generally recorded in the form of microreliefs along a track having a spiral or concentric circle configuration, the latter being the most frequently used in the case of recording digital data. It in particular facilitates random access to recorded data, as well as a recording subdivided into blocks or sectors.

During reading, no matter what the recording method, it is necessary to have signals permitting the synchronization of said reading. For this purpose, once again numerous methods are known.

According to a first method, in so-called multitrack systems, with each track reserved for the recording of useful information is associated at least one other track along which are recorded various informations and in particular clock signals permitting the synchronization of the reading of the useful information. According to a variant, the tracks used for synchronization are preetched and have optically detectable, regularly spaced disturbances. During reading, in a first variant (multibeam system), a first beam is focused on the useful information track and is used for reading such information, whilst a second separated beam, but constantly mechanically coupled with the first, is used for reading the synchronization information. In a second variant, (monobeam system) a single beam reads both informations. In this case, it is necessary for both information types to be easily discriminated. For example, the frequency spectra associated with these informations can differ. In this variant, the preetched synchronization information can also be used during the writing phase.

In order to increase the possible recording density, it has also been proposed to use a single track. In this case, the synchronizing clock signals can be derived from the actual information reading. To make synchronization easier, it is conventional practice to use so-called autosynchronizing codes or a maximum of transitions, no matter what the content of the source information to be recorded. Thus, in practice, the microreliefs have two reference levels associated respectively with logic values 0 and 1. The synchronizing signals are derived from the detection of the transition from a given level to another level. However, this type of coding does not permit a maximum recording density. It is also known for the purpose of increasing this density, to use non-autosynchronizing codes, e.g. the N.R.Z code (non-return to zero). The feature of this type of code is that there is no transition from one information bit to the other, if these two bits remain at the same logic value. It is then more difficult to derive the signals necessary for synchronization from the reading of the thus coded information. A solution can be found to this problem by regularly or non-regularly arranging along the tracks, recorded elements used solely for synchronization purposes called flags. Naturally, these flags must be "transparent" to the electronic circuits for detecting and processing the useful information. These synchronizing samples are used for resynchronizing for each passage of a flag beneath a read head the synchronizing signal generating circuits. It is therefore extremely important for the resynchronizing times to be very accurately defined, because they are less numerous than in the processes referred to hereinbefore.

However, numerous phenomena can be responsible for a deterioration in the synchronization quality. An example is constituted by focusing errors relative to the reading beam, as well as to errors in the radial following of the track respectively leading to variations in the surface of the reading spot or offcentring of said spot with respect to the mean axis of the tracks to be followed. This leads to variations in the shape of the detected signals, particularly variations in the rising and falling fronts thereof. However, in order to derive a synchronizing signal from the read signals, it is conventional practice to use one of these fronts. For example, it is possible to use a threshold logic element detecting the coincidence between the amplitude of the read signal and the said threshold. The variations in the time in which this detection occurs, due to the aforementioned parasitic phenomena, then lead to an incorrect synchronization of the reading or writing of the data.

BRIEF SUMMARY OF THE INVENTION

The problem of the present invention is to obviate the deficiencies of the prior art and in particular to greatly reduce the influence of errors of focusing and radial following of the track on the synchronization of the reading or writing.

The invention therefore relates to a process for the regeneration of synchronizing signals in an optical apparatus for recording - reading digital information data on a carrier performing a uniform movement, said data being recorded in the form of disturbances of at least one coating of the material of the carrier and which are optically detectable along tracks of a given configuration, said apparatus having means for focusing at a scanning spot a light energy beam onto one of the said tracks and optoelectronic means for detecting the interaction of said beam with said disturbances passing beneath the scanning spot, wherein it comprises a preliminary phase consisting of the recording of specific digital data in the form of a sequence of disturbances of said material coating at given locations of the tracks, which are selectively identifiable by optoelectronic detection means; a regeneration phase of the synchronizing signals comprising the following stages; generating a periodic clock signal at a fixed frequency, selective identification of specific digital data by optoelectronic detection means, dtermination of the intersection time of the centre of one of the disturbances forming the specific digital data with an axis passing through the centre of the scanning spot and orthogonal to the mean direction of the scanned track, and generating a synchronizing signal of the same frequency as the clock signal and having a phase shift which is directly proportional in amplitude and sign to the said displacements.

The invention also relates to an apparatus for performing such a process.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
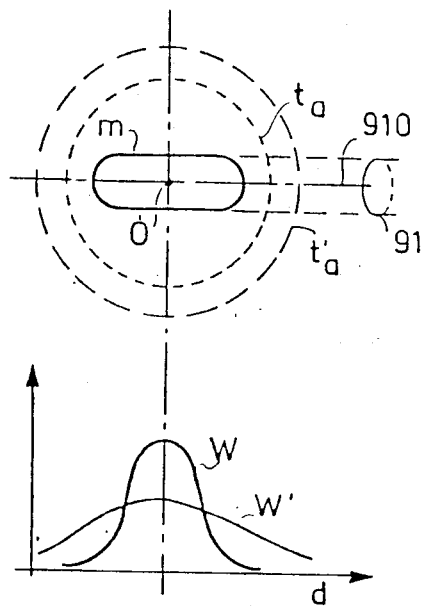
FIGS. 1 and 2 two types of characteristic situation occurring during the reading of information, namely focusing errors and radial tracking errors.

The standard processes for recording data on an optical disk are known. In general, the disk has at least one generally surface coating made from a material sensitive to certain types of radiation. According to one known process, during recording, a beam generated by a laser source is focused onto this material coating and microreliefs are produced along the tracks by a thermooptical effect. These tracks can be virtual, i.e. are formed at the time of recording the data, or can be preetched in any random form. The processes of reading the information and following the track are also well known. The track is generally followed either by using a second reading beam or by using the beam used for writing, or once again the same beam is used for both functions. The interaction of this beam with the microreliefs passing beneath the reading head produces interference orders, which are detected by optoelectronic detection means. Reading takes place either by transmission through the detection disk with the aid of photodetector cells positioned in the vicinity of the lower face of the disk, or by reflection of the radiation on the disk and reverse return of the light taken up by the optical systems comprising mirrors directing reflected beams towards the photodetector cells.

Apart from radial tracking, the photodetector cells can also be used for ensuring a correct focusing of the reading beam on the recording face. Finally, these cells are used for generating electrical signals representing the recorded information.

For applications in the informatics field, it is necessary to be able to record in digital data in a random manner at a random point on the disk. In addition, it is necessary to have random access to these informations during reading. Another requirement in connection with this type of device is that the reading must be synchronized with the writing. However, for numerous reasons linked with parasitic phenomena such as speed fluctuations, an external clock is not sufficient for this purpose. The synchronizing signals must therefore be directly derived from the recorded data, so as to have a correlation between the read data and the recorded data.

In practical terms, the microreliefs appear in the form of disturbances along the associated tracks at two clearly defined levels, the two levels being separated by transitions. The intertrack zones are uniform zones having one of these levels, as a function of whether these microreliefs are in the form of crests or valleys. The detection means convert these level variations into a sequence of pulses also having two states, which can be associated with logic states 0 and 1 and which also have more or less abrupt transitions between these two states.

In the prior art, it is conventional practice to derive synchronizing signals from the appearance of one of these transitions, e.g. a rising front or a falling front. A correct synchronization assumes that the instant at which these rising or falling fronts appear can be defined with sufficient accuracy and does not fluctuate over a period of time. However, due to errors in the focusing and the radial following of the track, this condition is not satisfied in practice.

FIG. 1 illustrates the effect of focusing errors. FIG. 1 diagrammatically illustrates a microrelief m representing elementary digital data recorded along a track 91 of mean axis 910. Generally, the microrelief is symmetrical to this axis. The same drawing shows the impact of the reading spot $t_a$, when the beam is correctly focused. It has been assumed, and this is general ly the case, that the spot has a symmetry of revolution of centre 0, said point 0 coinciding at the time shown in the drawing with the centre of symmetry of microrelief m. It is accepted that the spot and the microrelief effect a relative movement due to the rotation of the disk. On the lower part of the drawing, curve W represents the convolution of spot $t_a$ with the microrelief. This curve is homothetic with the distribution of the energy diffracted by the spot as a function of the distance from point 0 and also to the curve of the energy intercepted by a punctiform detector as a function of time when the microrelief, displaced by the rotation of the disk, passes beneath the reading spot.

When defocusing occurs, the reading spot has a larger surface area and this is illustrated by the pattern under reference $t'_a$. The corresponding convolution curve is w'. The envelope of this curve is much wider than the envelope of curve w.

Figure 2:
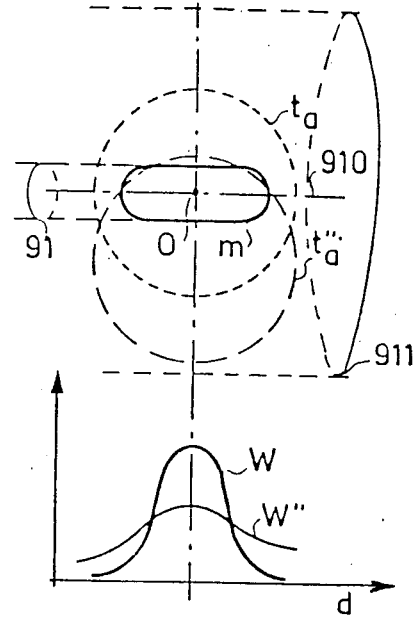

In turn, FIG. 2 illustrates the influence of the radial tracking or following error. Once again, there are two spots: $t_a$, correctly centred beneath the mean axis of track 91, and spot $t''_a$ offcentred relative to said mean axis. The corresponding convolution curves are respectively w and w''. It can also be seen that the envelope of curve w'' is wider and has a smaller amplitude than that of curve w.

However, curves w, w' and w'' have an interesting characteristic, namely they all have the same axis of symmetry. The same applies with regards to the electrical signal supplied by the detection means in response to the interaction of the reading spots with the passage of the microreliefs. The time of the passage of the centres of the microrelief beneath the reading spot and the centre of the reading pulse generated by the photodetector means coincide, provided that the spot and the microrelief have a symmetry of revolution at least along one axis. The spot can be elliptical, e.g. as is the case when a semiconductor laser is used.

The invention takes advantage of this property and proposes a process permitting an invariable synchronization with the shape factor. According to the main feature of the invention, pulses necessary for defining a synchronization during the reading or writing of digital information are generated synchronously with the passage of the centre of symmetry of the microreliefs beneath a reading head. These microreliefs can be specific, i.e. recorded for the sole purpose of generating synchronizing pulses or can be constituted by recorded digital information.

As has been stated hereinbefore, the digital information can be recorded in coded manner in accordance with a number of different rules. A first series of codes, called autosynchronizing, or at least have a maximum of transitions. In order to increase the recording density, it is conventional practice to use other types of code, e.g. the N.R.Z. code (non-return to zero).

Figure 3:
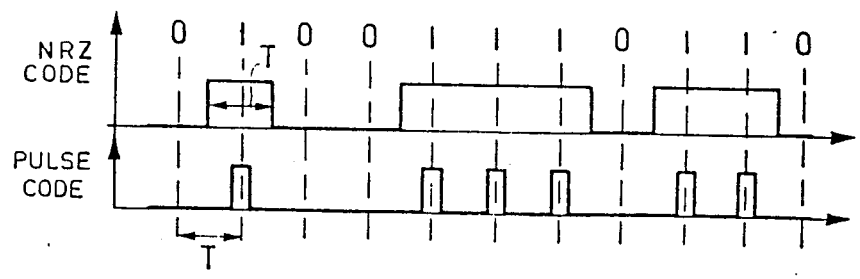
FIG. 3 two types of code used for coding the same binary word.

FIG. 3 illustrates two types of codes: the pulse code and the N.R.Z. code, for a random binary word having the following logic states: 0 1 0 0 1 1 1 0 1 1 0. It is immediately apparent for FIG. 3 that the pulse code has far more transitions than the N.R.Z. code. It is therefore more difficult to derive the information for the synchronization from the latter. In FIG. 3, period T represents the duration of an elementary binary signal or bit, which corresponds to a clock frequency $f=1/T$.

Although the invention is not limited to this variant, in the case where an N.R.Z. code or the like is used, it is preferable to use specific recordings or flags for the sole purpose of generating synchronizing signals. These flags can be recorded prior to any recording of useful information and are used for generating synchronizing signals during the recording of said information and during successive reading operations. Alternatively, they are multiplexed in time with the recording of the information and are used during the subsequent reading thereof.

In both cases, it is necessary that the specific information can be selectively identified by reading means, so as to generate synchronizing signals which are only correlated with the appearance of these specific flags and are "transparent" during the reading of said useful information.

For this purpose, when using a N.R.Z-type code, specific flags are recorded in the form of pulses, whose time intervals separating fronts of the same nature are forbidden in the medulation code. For the N.R.Z. code, times T and integral multiples of T are used. For the specific pulses recorded, a duration equal to the smallest half-integral time usable is chosen, i.e. 1.5 T.

Figure 4:
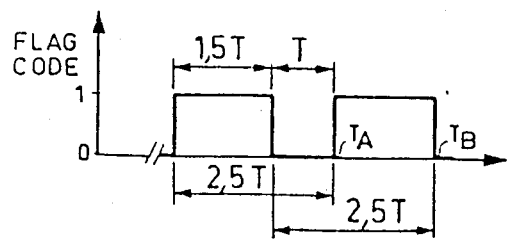
FIG. 4 a diagram illustrating a particular code used in a preferred variant of the invention.

Such a pulse is illustrated by the diagram of FIG. 4. A first part is at logic 1 during the time interval equal to 1.5 T and at logic 0 during the time interval equal to T. According to a preferred variant, the process of the invention will now be described in greater detail with the aid of the device represented by the flow chart of FIG. 5. The optoelectronic detection members and the associated electronic circuits 1 supply a reading signal $V_L$ transmitted on the one hand to conventional circuits for processing the read data processing units 6, and on the other hand to the specific circuits according to the invention.

According to the process of the invention, it is firstly necessary to determine whether the signals $V_L$ have resulted from the reading of useful information or from the reading of the flags used for the synchronization. This stage is performed with the aid of flag detection circuits 2, which will be described in greater detail hereinafter. These circuits supply an authorization signal $V_A$ transmitted to phase shift calculators 3. According to the fundamental feature of the invention, the latter have the function of supplying information C representing the time at which coincidence exists between the centres of the optical spot and the microrelief passing under said spot. The authorization signal $V_A$, e.g. after logic inversion $\overline{V}_A$ by inverter 7, can be used for inhibiting/authorizing the operation of read data processing units 6.

The device also comprises clocks 4 generating synchronizing pulses H regenerated by circuits 5, i.e. undergoing phase correction and transmitted in the form of a resynchronized signal $H_S$ to the read data processing units. Clocks also supply the phase shift calculator 3 with reference clock signals $H_R$ and signals H. Conventionally, these clocks comprise a quartz-controlled oscillator having a high stability level.

In a preferred manner, the identification of the flags and the generation of the information necessary for the determination of the coincidence between the passage of the centre of the microreliefs and the optical centre of the reading spot can take place with the aid of a single circuit performing the double detection of the rising and falling fronts of two successive pulses forming a flag.

Figure 6:
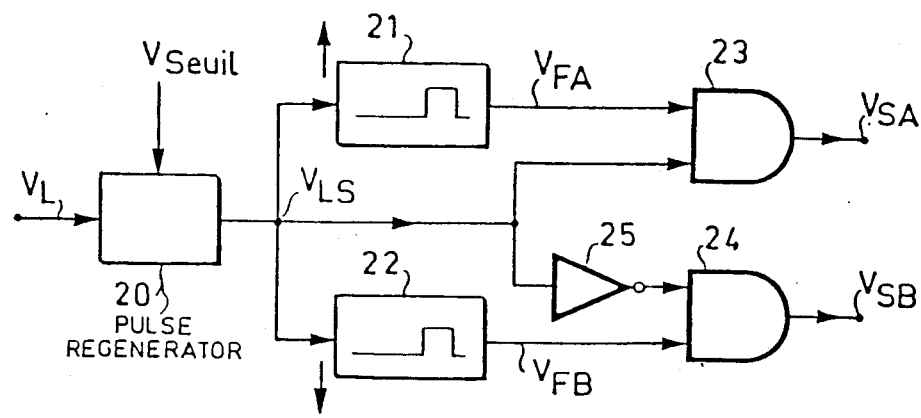
FIGS. 6 and 7 in greater detail, certain elements of these devices.

Such a circuit is illustrated in FIG. 6 and comprises a first circuit 20 for shaping the read signal $V_L$. It advantageously comprises a bistable element comparing a read circuit $V_L$ with a threshold voltage $V_{THRESHOLD}$ supplying a pulse $V_{LS}$, e.g. and at a logic state 1 when the read signal exceeds the threshold and at logic state 0 in the opposite case. Signal $V_{LS}$ is transmitted to two circuits 21, 22 for generating two pulse signals defining time or data windows.

Figure 8:
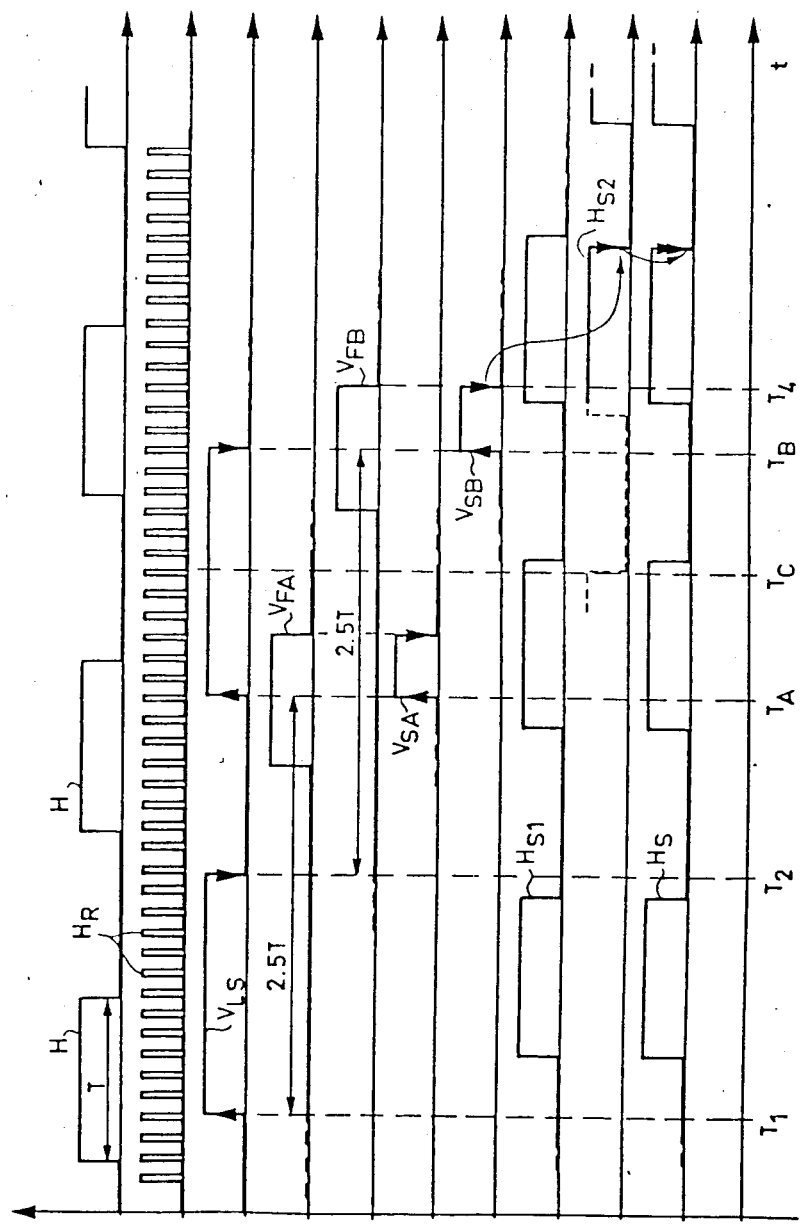
FIG. 8 a diagram showing the most significant signals of the operation of the device according to the invention and their time interrelationships.

These signals are illustrated by the diagram of FIG. 8. Curve H represents the pulses supplied by clock 4 of basic time T. Pulse signal $V_{LS}$ can have a phase shift compared with the clock signals random modulo the period of said signals. Due to the aforementioned invariability, the time period separating two fronts of the same nature, i.e. rising or falling, is also invariable to the first order with the shape factor, and is therefore equal to 2.5 T.

The first circuit 21 is triggered by the rising front of the first flag pulse at time $T_1$ on the diagram and supplies a pulse $V_{FA}$ whose centre is delayed by 2.5 T. The second circuit 22 is triggered by the first falling front at time $T_2$ and also supplies a pulse defining a time window $V_{FB}$ delayed by the same value. The circuits of FIG. 6 also comprise two AND gates 23, 24, receiving at a first input respectively signal $V_{FA}$ and $V_{FB}$ and at a second input respectively signal $V_{LS}$ and said same signal inverted by logic inverter 25. At the outputs of the logic AND circuits 23, 24 are present signals $V_{SA}$ and $V_{SB}$, whose respective rising fronts coincide with the rising front and the falling front of the second flag pulse, i.e. with times $T_A$ and $T_B$. By correctly regulating the duration of time windows $V_{FA}$ and $V_{FB}$ in state 1, AND gates 23 and 24 only supply pulses when there is a reading of a code associated with the flag. In the opposite case, these outputs will remain at logic state 0. Thus, the first function of identifying the flags is realised.

The information relating to times $T_A$ and $T_B$ make it possible to determine the mean of these two times $T_C$, representing the centre of the second flag pulse. The authorization signal of the type illustrated in FIG. 5: $V_A$ can be derived from signal $V_{SB}$.

Circuits 21 and 22 can be formed in each case by two monostable flip-flops supplying pulses triggered respectively by the rising and falling fronts and whose duration is slightly longer and slightly shorter than time interval 2.5 T. The logic intersection of these two pulses can be used for determining the time window.

Figure 5:
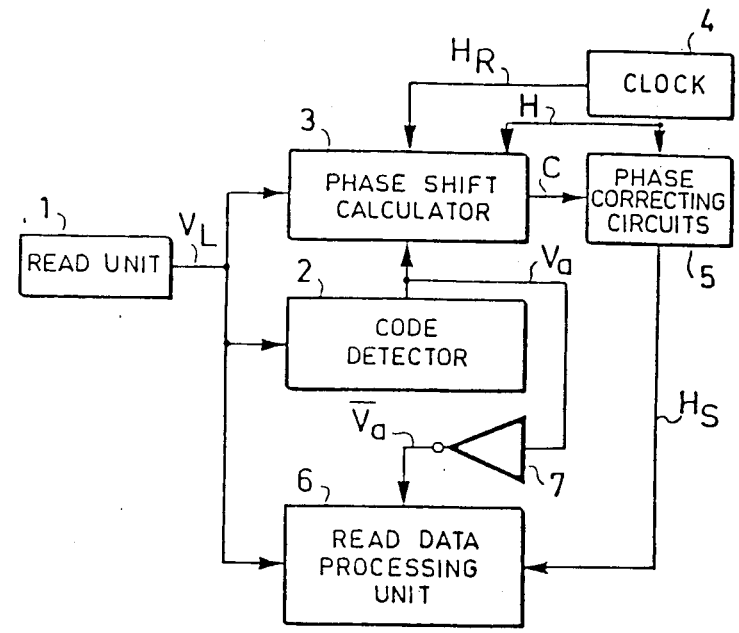
FIG. 5 a flow chart of a device according to the invention.
Figure 7:
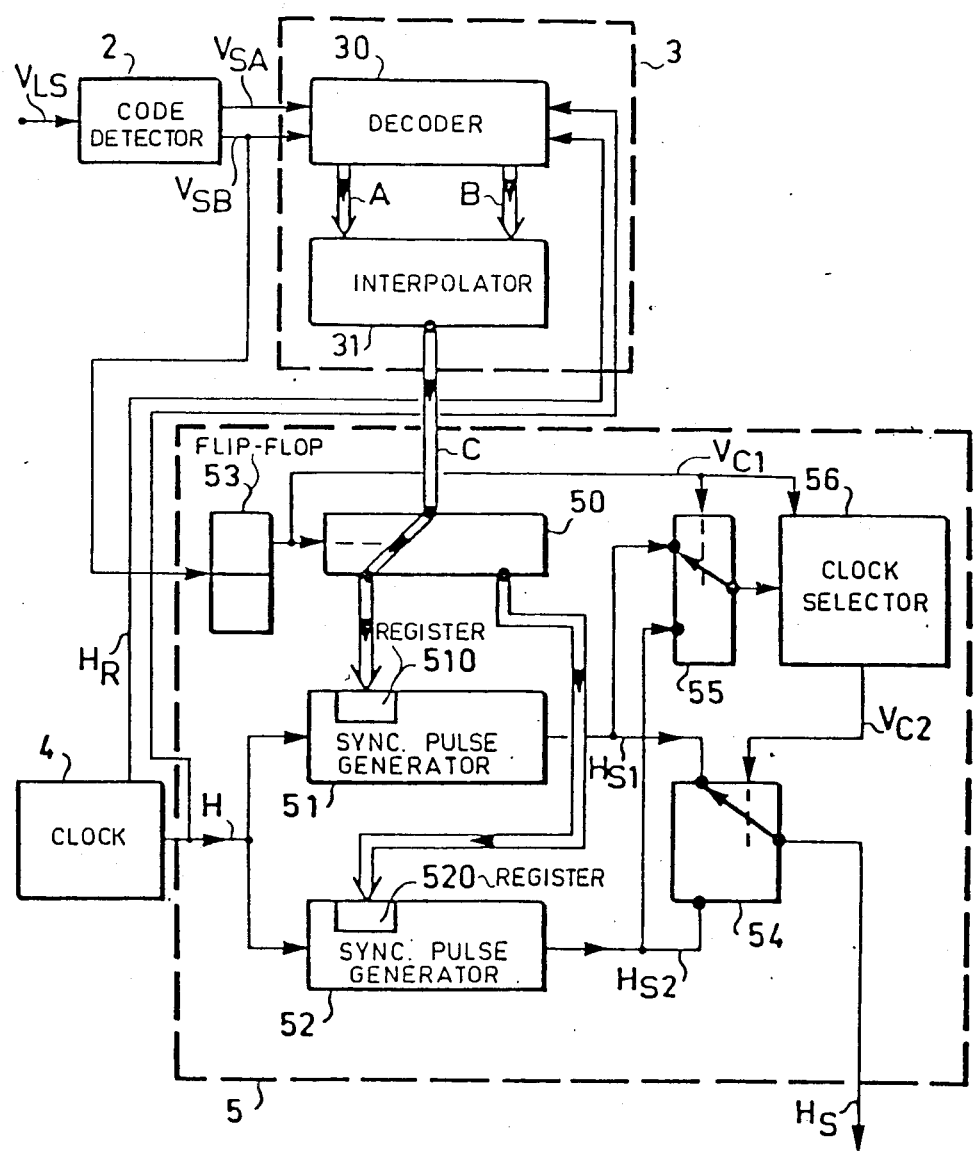

FIG. 7 illustrates in greater detail, the other circuits of the devices of FIG. 5. The pulse signals $V_{SA}$ and $V_{SB}$ are transmitted to a digitizing circuit 30 supplying binary words A and B, representing the displacement of the rising fronts of these signals with respect to a reference time. Clock signal H and a clock signal $H_R$, whose frequency is a multiple of the repetition rate of the basic clock signal H and related to the fixed phase of this signal are used for this purpose. The second clock signal can be easily derived from signal H with the aid of a frequency multiplier. For example, in the diagram of FIG. 8, clock signal $H_R$ has a repetition rate which is 16 times higher than that of signal H, so that it defines 16 subintervals. A decoder can supply two binary words A and B representing the displacement of times $T_A$ and $T_B$ relative to a fixed reference time of the period of the basic clock signal H, modulo 16. An interpolator 31 can associate with each pair A and B, a binary word C representing the displacement of centre $T_c$ of the second flag pulse, by reference to the same reference time of the period of the basic clock H. These interpolators can advantageously be constituted by a P.R.O.M.

This information is used for the phase correction, on each passage of the flag, of the clock signal used as the synchronizing signal $H_S$. This signal can be used either during the reading of digital information between the passage of two flags, or, when these flags are recorded before the recording of the data in preetched form, for the reading of said data.

The new regenerated clock signals must be in a constant phase relationship with the passage beneath the reading spot of the centre of microrelief relief m, i.e. with time $T_C$, the centre of the second pulse of the flag, as has been determined. The synchronizing signals $H_S$ have the same frequency as the clock signals H and a phase relationship dependent on the value of control word C, which is stored during the time interval between the passage of two successive flags.

Following the calculation of a new control value C, it is necessary in most applications that the phase correction of the synchronizing signals does not take place in a random manner. According to a preferred variant of the invention, a new synchronizing signal is generated having a phase displacement with clock signal H determined by the new calculated value of C. This new signal is substituted for the old signal as the synchronizing signal at a clearly defined time. For example, this can be the appearance of the first falling front of the new clock signals For this purpose, and as a non-limitative example, it is possible to use two separate synchronizing signal generators, whose respective outputs $H_{S1}$ and $H_{S2}$ are alternatively used after each flag detection as sync signals $H_S$. Each of the generators 51, 52 can e.g. comprise a programmable delay line or a phase lock loop oscillator controlled by the binary word C; They also comprise in each case a register 510, 520 for recording the control word C. A two-position switch 50 alternately switches this control word to the said registers with the timing of the passages of the flags and calculations of values C. On each detection of the flags, e.g. on the rising front of signal $V_{SB}$, a bistable circuit 53 supplies a control signal $V_{C1}$ to switch 50. This signal is also transmitted to a second switch 55, which receives on two inputs the clock signals $H_{S1}$ and $H_{S2}$, alternately transmitted to a clock selector 56. The clock selector receives at one input the control signal $V_{C1}$ and transmits this signal to a third switch 54 in the form of a control signal $V_{C2}$, during the detection of the first falling front of clock $H_{S1}$ or $H_{S2}$, transmitted thereto by switch 55 and which follows the transition of control signal $V_{C1}$. This selector can be formed by a JK-type flip-flop. Control signal $V_{C2}$ controls the switching of switch 54 and alternately connects the outputs of circuits 51 and 52 to the connection carrying the sync signals $H_S$.

The lower part of the diagram of FIG. 8 illustrates the operation of the circuits described hereinbefore. At time $T_B$, on ignoring the time necessary for interpolation, a value of C is available at the output of interpolators 31. On assuming that the existing sync signals $H_S$ are supplied by the output of circuits 51: $H_{S1}$ at time $T_4$ during the deenergizing of signal $V_{SB}$, the new value of C is transmitted to register 520 and the clock signals $H_{S2}$ undergo phase correction in accordance with this new value C. The replacement of the old clock signals $H_{S1}$ by the new clock signals $H_{S2}$ takes place at time $T_5$ coinciding with the first falling front of these new clock pulses. Switch 54 then connects the connection carrying signals $H_S$ to the output of circuits 52. The clock signals $H_{S2}$ are used as synchronizing signals up to the next detection of the passage of a flag beneath reading spot $t_a$ and the calculation of a new value for C, in accordance with the process described hereinbefore.

It is obvious that switches 50, 54 and 55 are formed from electronic circuits, e.g. EXCLUSIVE - OR logic gates, receiving at a first series of inputs the signals to be switched and at a second series of inputs the control signal $V_{C1}$ or $V_{C2}$.

The present invention can be realised in numerous apparatuses for the optical writing-reading of a data carrier. It is compatible with processes deriving synchronizing signals from recorded data or processes using specific flags, whereby the latter can be recorded at predetermined locations on the tracks, which may or may not be regularly spaced. According to a special variant, these flags can be preetched and are used for generating sync signals during the recording of subsequent digital data. Thus, the process of the invention permits a very considerable flexibility of use.

In certain applications, the radial following of the track is also carried out with the aid of flags distributed along the tracks. The same can apply with respect to the focusing, in which case the process of the invention makes these procedures easier. Thus, as stated in connection with FIGS. 1 and 2, the process permits a very considerable tolerance with regards to focusing errors and radial tracking errors. If reference is once again made to FIG. 2, the detectability zone of the flags defines a fictitious track 911 of approximately double the diameter of the reading spot $t_a$. If the detectability zones of two contiguous tracks overlap, the synchronization can be made completely independent of the radial following of the track. This can be used with advantage when jumping from one track to the other, whereby the two tracks need not be contiguous. This type of operation is performed for a random search for information. During these track jump phases, the synchronization can be maintained, although there is no radial following of the track. Thus, the disk continues to rotate and the reading spot will encounter the flags used for resynchronization, said flags belonging to different tracks during the intersection of the tracks by the trajectory of the reading spot.

Figure 9:
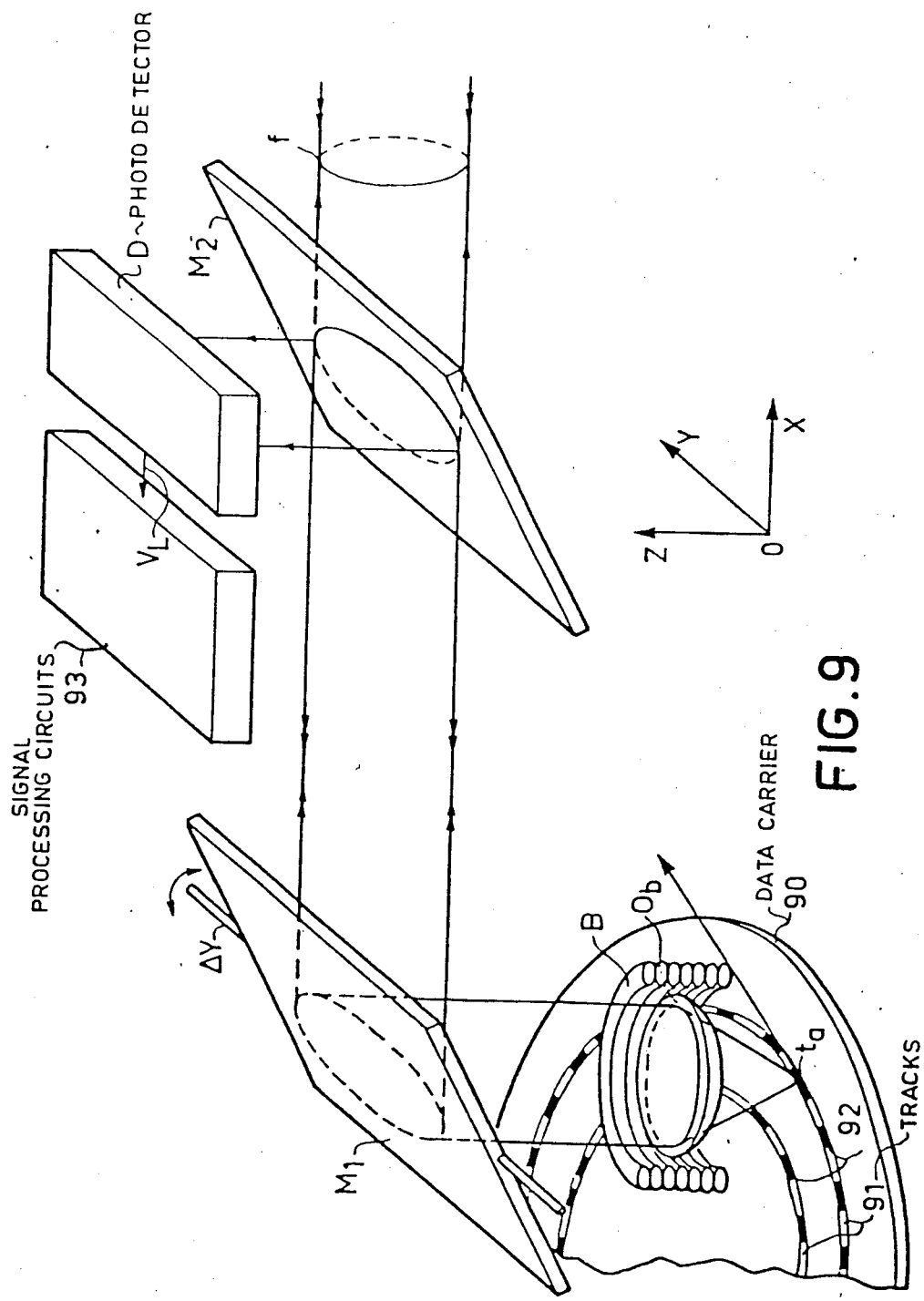
FIG. 9 is a diagram showing an optical read-write apparatus in which the present invention may be used.

FIG. 9 diagrammatically illustrates an apparatus for optically writing and/or reading on a carrier, in which the process according to the present invention can be used. A disk 90 rotating in a plane X or Y about an axis parallel to the third axis of the reference trihedron XYZ was on its upper face a coating of thermosensitive material in which information is recorded along tracks 91. These tracks also have flags 92 associated with a specific code, in the manner described hereinbefore. The disk with a diameter of approximately 30 cm performs a rotary movement imparted by a drive motor, integral with the chassis of the optical writing - reading system. In conventional manner, the e.g. 40,000 tracks are recorded within a ring centred on the rotation axis and having a width of approximately 8 cm. The number of flags recorded on the concentric circular tracks must be adequate to overcome the parasitic phenomena linked with the nature of the carrier or the fluctuation of the rotation speed. It is therefore typical to record 3,500 flags.

In the embodiment illustrated in FIG. 9, the device providing access to a given track of the disk comprises a fixed part having a not shown energy source generating a beam of parallel rays f and a moving part constituted by the actual write - read head. As is known, the latter comprises a microscope-type objective $O_b$, fixed to an electromagnetic coil B moving in the magnetic field of a not shown permanent magnet ensuring the vertical control or focusing and a galvanometer mirror $M_1$ ensuring the radial control. Galvanometer mirror $M_1$ moves around an axis $\Delta_y$ parallel to the axis OY of the reference trihedron, in order to ensure the radial control. Beam f is focused in a spot $t_a$ at a given point of the disk on one of the aforementioned tracks 91. It is assumed here that the system is of the monobeam - monotrack type, i.e. a system in which the single beam f is alternately used for writing and reading, as well as for focusing and radially following the track. This falls outside the scope of the invention.

In order to detect the reading beam reflected by the disk, e.g. a semitransparent plate $M_2$ is placed on the path of the single beam f. The beam reflected by the disk is then detected by photodetectors D, which generates signal $V_L$ to signal processing circuits 93. The latter in particular comprise the circuitry according to the invention, e.g. the device described with reference to FIG. 7.

The invention is also compatible with writing - reading devices using more than one beam, e.g. a reading beam and a writing beam. In more general terms, the present invention is not limited to the embodiments described with particular reference to FIGS. 5, 6 and 7 and any appropriate means for detecting the centre of the pulses intended for the synchronization of the type shown in FIG. 4 can be realised in accordance with the main feature of the invention. As a non-limitative example, apart from the processes described hereinbefore and which are of a purely digital nature, it is possible to use analog processes, such as peak detection by pulse differentiation.

What is claimed is:

1. A process for identifying an occurrence an optical interaction of an illuminating spot with two synchronizing marks in an optical system; said system performing the optical scanning of a reference surface of a data carrier with said illuminating spot; said system having clock means, means for causing said spot to scan any one of a plurality of track elements arranged on said reference surface, and optoelectronic detection means for sensing radiation modified by the optical interaction of said spot with synchronizing flag means repeatedly arranged along each one of said track elements; each of said flag means comprising said two synchronizing marks, said two synchronizing marks being arranged lengthwise in said each flag means so as to have each a predetermined portion, said predetermined portions being homologous and situated a specific distance from each other; said process comprising the steps of:
   using said predetermined portions for generating pulsed electrical signals supplied by said optoelectronic detection means,
   generating a time duration matched with the ratio of said specific distance to the scan velocity of said spot;
   identifying the occurrence of a duration between the scanning of said predetermined portions being similar to said time duration.

2. A process as claimed in claim 1, wherein said predetermined portion of a synchronizing mark is a center of this mark.

3. A process a claimed in claim 1, wherein said predetermined portion of a synchronizing mark is an edge of said mark.

4. A process as claimed in claim 1, where in said time duation begins with the pulsed electrical signal corresponding to the first scanned mark and ends by a window.

5. A process as claimed in claim 4, wherein said window is used for gating a pulsed electrical signal corresponding to the second mark.

6. An identifying signal generator device for determining an occurrence an optical interaction of an illuminating spot with two synchronizing marks in an optical system performing the optical scanning of the reference surface of a data carrier with said illuminating spot; said system having clock means, means for causing said spot to scan any one of a plurality of track elements arranged on said reference surface, and optoelectronic detection means for sensing radiation modified by the optical interaction of said spot with synchronizing flag means repeatedly arranged along each one of said track elements; each of said flag means comprising said two synchronizing marks, said two synchronizing marks having each a predetermined portion, said predetermined portions being homologous and situated a specific distance from each other; said device comprising:
   generator means using said predetermined portions of the marks for generating pulsed electrical signals
   means for generating a time duration matched with the ratio of said specific distance to the scan velocity of said spot; and
   identifying means supplying said occurrence when a duration between the scanning of said predetermined portions is similar with said time duration.

7. A device as claimed in claim 6, wherein said means provide said time duration in the form of a window applied to a control input of a gating means, said gating means having a signal input fed from the output of said means for generating said pulsed electrical signals, the output of said gating means being connected to a control input of said clock means.

8. A data carrier having on a reference surface a plurality o adjacent track elements for digital data storage in alloted non-contiguous portions of said track elements, said data carrier comprising:

flag means repeatedly arranged along each one of said track elements and intermediate said non-contiguous portions for producing specific synchronizing signals in response to the lengthwise scanning thereof with an illuminating spot;

each of said flag means comprising a pair of spaced synchronizing marks succeeding one another in the direction of scanning;

each mark of said pair of marks having, a predetermined portion;

the distance in the scanning direction in each of said flag means, from the predetermined portion of the first scanned mark to the homologous predetermined portion of the second scanned mark of said pair of synchronizing marks corresponding to a forbidden distance due to a modulation code used to store said digital date in said alloted non-contiguous portion of said track elements.

9. A data carrier a claimed in claim 8, wherein said distance is two and a half times an unit length corresponding to said modulation code.

10. A data carrrier as claimed in claim 8, wherein said marks are prerecorded.

11. A data carrier as claimed in claim 8, wherein said marks are simultaneously recorded with said digital data.

12. A data carrier as claimed in claim 8, wherein said digital data are recorded using a modulation code; said flag means having transitions forbidden in said modulation code, thereby preventing said synchronizing signals from being produced in response to the scanning of said digital data.

13. A data carrier as claimed in claim 8, wherein said flag means ar uniformly spaced along said track elements.

14. A clock resynchronization process for use in an optical system performing the optical scanning of a reference surface of a data carrier with an illuminating spot having a center, said system having clock means, means for causing said spot to scan any one of a plurality of track elements arranged on said reference surface, and optoelectronic detection means for sensing radiation modified by the optical interaction of said spot with synchronizing flag means repeatedly arranged along each one of said track elements, each of said flag means comprising at least one recorded synchronizing mark having in the direction of scanning a front edge, a rear edge and a center situated midway between sid front and rear edges, said process comprising the steps of:

extracting from a pulsed electric signal supplied by said optoelectronic detection means an intersection time of the center of said spot with the center of said mark;

determining a time value corresponding to the time lag of said intersection time with reference to a time scale provided by said clock means; and deriving from said time scale a further time scale resynchronized under the control of said time value.

* * * * *